United States Patent [19]

Onwumere et al.

[11] Patent Number: 5,047,456

[45] Date of Patent: Sep. 10, 1991

[54] THERMALLY REVERSIBLE SUPERABSORBENT POLYMERS

[75] Inventors: Fidelis C. Onwumere, Norcross; Sharon L. Greene, Alpharetta, both of Ga.; Shirley H. Wright, Greenville, S.C.

[73] Assignee: Kimberly-Clark Corporation, Neenah, Wis.

[21] Appl. No.: 341,519

[22] Filed: Apr. 21, 1989

[51] Int. Cl.$^5$ .................... C08J 89/00; C08K 11/00; C08G 18/81; C08G 18/10

[52] U.S. Cl. .................... 524/13; 524/15; 524/16; 524/17; 524/335; 528/45; 528/65; 528/76

[58] Field of Search .................. 524/13, 15, 16, 17, 524/18, 35; 528/45, 65, 76

[56] References Cited

U.S. PATENT DOCUMENTS

| | | | |
|---|---|---|---|
| 2,907,745 | 10/1959 | Greenlee | 528/84 |
| 3,011,997 | 12/1961 | DeWitt | 528/76 |
| 3,679,631 | 7/1972 | Mayes | 528/61 |
| 3,682,861 | 8/1972 | Radlmann et al. | 528/64 |
| 3,899,467 | 8/1975 | Bonk et al. | 528/76 |
| 3,901,852 | 8/1975 | Shah | 528/85 |
| 3,909,497 | 9/1975 | Hendry et al. | 528/503 |
| 3,931,117 | 1/1976 | Leonard | 528/45 |
| 3,954,718 | 5/1976 | Swidler | 328/85 |
| 4,008,192 | 2/1977 | Mijs et al. | 528/129 |
| 4,055,550 | 10/1977 | Panandiker et al. | 528/45 |
| 4,055,551 | 10/1977 | Panandiker et al. | 528/45 |
| 4,069,208 | 1/1978 | Horschele | 528/45 |
| 4,160,749 | 7/1979 | Schneider et al. | 528/445 |
| 4,201,853 | 5/1980 | Henry et al. | 528/85 |
| 4,281,089 | 7/1981 | Pazos | 525/456 |
| 4,371,684 | 2/1983 | Quiring et al. | 528/65 |
| 4,403,086 | 9/1983 | Holuka et al. | 528/45 |
| 4,410,679 | 10/1983 | Holubka et al. | 528/45 |
| 4,762,888 | 8/1988 | Sun et al. | 525/125 |
| 4,767,825 | 8/1989 | Pazas et al. | 525/408 |

FOREIGN PATENT DOCUMENTS 1081406  8/1967  United Kingdom .

OTHER PUBLICATIONS

D. C. Allport and W. H. Janes (eds.), *Block Copolymers*, Applied Science Publishers, Ltd., 1973, pp. 224–249.

S. Petersen, *Annalen*, 562, 205 (1949) (Chemical Abstracts, vol. 44, cols. 115–118).

Y. Iwakura and K. Hayashi, *Yuki Gosei Kagaku Kyokai Shi*, 16, 533 (1958) (Abstract).

"Chain Extension Polymerization of Polyoxyethyl Lenes Using the Aromatic Urethane Links: A Study of Their Thermal Reversible Properties".

"Thermally Reversible Urethanes", Kenneth B. Wagener and Mark A. Muela, 5-4-88, 2 pages letter to Dr. Bernard Cohen from K. B. Wagener.

"A Novel Apparent Sublimation of a Polymer", Kinstle and Sepulveda Polymer Letters Edition, vol. 15, pp. 467–469 (1977).

"Thermal Dissociation of Urethanes", Yuhsuke Kawakami Polymer Journal, vol. 13, No. 4, pp. 343–349 (1981).

"Blocked Isocyanates", Zeno W. Wicks Jr., Progress in Organic Coatings 3 (1975) 73–99.

"Preparation of new Blocked Diisocyanate for Dental Application", G. Y. Le, Journal of Polymer Science: Part A: Polymer Chemistry, vol. 25, 607–615 (1987).

"Thermally Reversible Urethanes", K. B. Wagener and M. A. Murla, Dept of Chemistry, Univ. Of Florida, Feb. 15, 1988.

*Primary Examiner*—Nathan M. Nutter
*Attorney, Agent, or Firm*—Karl V. Sidor

[57] ABSTRACT

The invention provides a thermally reversible superabsorbent polymer adapted for use in melt processes, the polymer having a thermally reversible bond which is adapted to evanesce at an elevated temperature and revert to a thermally reversible bond upon cooling to ambient temperature so that the polymer is adapted, upon being heated to that elevated temperature, to dissociate into melt processable polymer fragments and, upon being cooled from that elevated temperature to ambient temperature, to re-associate. Also disclosed are superabsorbent polymer fibers and sheets formed from the thermally reversible superabsorbent polymer. The polymer fibers may be meltblown fibers which may be formed into a coherent nonwoven web. The meltblown fibers may include microfibers. The meltblown web may also include at least one type of secondary fiber, particulates or a mixture of fibers and particulates.

34 Claims, 3 Drawing Sheets

THERMALLY REVERSIBLE SUPERABSORBENT POLYMERS

FIELD OF THE INVENTION

The present invention relates to thermoplastic absorbent polymers and a method of making the same. Generally speaking, the present invention relates to materials containing aromatic urethane bonds.

BACKGROUND OF THE INVENTION

Disposable absorbent products typically contain an absorbent batt of cellulosic fibers. The absorbency of such products have been improved by incorporating superabsorbent materials into the absorbent batt. Superabsorbent materials, also referred to as hydrogels, may be based on acrylate and methacrylate polymers and copolymers, starch or a modified starch, hydrolyzed cross-linked polyacrylamides, cross-linked sulfonated polystyrenes or maleic anhydride, and polyoxyalkylene glycols. For example, absorbent polyoxyalkylene glycols may be made from isocyanate-capped polyesters or poly-(oxyalkylene) glycols and difunctional extenders.

If utilized with an absorbent batt, superabsorbent material is usually added to the absorbent batt in particulate form. Unfortunately, particulate superabsorbents often change location in or fall out of the absorbent batt and/or exhibit gel-blocking, a phenomenon which inhibits migration of fluid to available superabsorbent particles. Consequently, thermoplastic superabsorbent polymers which can be melt processed into nonwoven fibrous webs are highly desirable.

Generally speaking, thermoplastic superabsorbent polymers are formed from water soluble polymer segments which are joined by chemical bonds that allow the water soluble polymer segments to swell and absorb water without dissolving. High molecular weights are usually necessary for such polymers to have superabsorbent properties as well as strength and toughness. The high molecular weight polymers typically have high viscosities and must be processed at high temperatures which improve the processability but may partially degrade the polymer. The resulting products may contain polymers that are partially degraded causing some loss of desired physical properties. In some situations, high molecular weight polymers may be partially degraded by overheating to reduce the viscosity of the polymer to a useful range for processing resulting in superabsorbent materials that have low gel strength and absorbent capacity, and high levels of extractables.

Aromatic urethane bonds are known to evanesce at elevated temperatures leaving behind aromatic alcohols and aromatic isocyanates. This phenomenon is used to form water-based urethane coatings that are stable at room temperature. Such coatings contain isocyanates which have been reacted with a material such as, for example, phenol, to create a reversible aromatic urethane bond. Isocyanates that have been blocked in this manner are unable to react at room temperature with compounds that normally react with isocyanates but will react at temperatures which cause the aromatic urethane bond to evanesce.

DEFINITIONS

As used herein, the term "thermally reversible bond" refers to a chemical bond which is capable of evanescence and reversion such as, for example, an aromatic urethane bond. Generally speaking, evanescence and reversion of a thermally reversible bond is an equilibrium process. Above a threshold temperature, evanescence of the bond is favored. Below a threshold temperature, reversion of the bond is favored. The temperature of evanescence and reversion of a thermally reversible bond may be altered by substituting electron donating or electron withdrawing substituents at a location where they are capable of donating electrons to or withdrawing electrons from the thermally reversible bond.

As used herein, the term "soft segment" refers to an amorphous or slightly crystalline portion of a polymer. Typical soft segments may be formed from aliphatic polyethers or aliphatic polyesters having molecular weights from about 500 to about 25,000. Other soft segments may be formed from, for example, polyethylene glycol, polytetramethylene ether glycol, hydroxyl-terminated polyesters, polypropylene glycols, hydroxyl-terminated polydimethylsiloxanes, polyesters, nylons/polyamides, polyolefins, polycarbonates and polyureas.

As used herein, the term "hard segment" refers to a glassy or highly crystalline portion of a polymer, the portion being formed from molecules that are substantially rigid and symmetrical. A hard segment may be formed from, for example, a short chain oligomer of a polyurethane or polyurea. A hard segment may contain molecules which are bridged by a thermally reversible bond that evanesces upon exposure to heat.

As used herein, the term "thermally reversible polymer" refers to a polymer formed by the chemical union of at least two soft segments by a hard segment that includes a thermally reversible bond. A thermally reversible polymer may contain additional soft segments that are united by one or more hard segments that do not have a thermally reversible bond.

As used herein, the term "polymer fragment" refers to a piece of polymer formed upon the evanescence of a thermally reversible bond of a thermally reversible polymer. A polymer fragment includes at least one soft segment and a part of the hard segment that, before evanescence, adjoined the thermally reversible bond.

As used herein, the term "degradation temperature" refers to the temperature at which chemical bonds evanesce in an irreversible manner because of irreversible chemical reactions.

As used herein, the term "low molecular weight" refers to a polymer or polymer fragment having a number average molecular weight less than about 40,000 as determined by gel permeation chromatography. Molecular weights were determined utilizing a Beckman Model 112 Solvent Delivery System (Beckman Instruments, Inc., Fullerton, Calif.), a Beckman Model 421 System Controller, and Waters 500, $10^3$, and $10^4$ Angstrom $\mu$Styragel columns (Waters Chromatography Division, Millipore Corporation, Milford, Mass.) in chloroform, HPLC-grade (Burdick and Jackson Laboratories, Inc., a subsidiary of American Hospital Supply Corporation), equilibrated at 30 degrees Centigrade. Sample peaks were measured using a Waters Model 410 Differential Refractometer. Calibration curves were constructed using standards having molecular weights in the range from 600 to 600,000; below about 18,000 the standards were polyethylene glycols from American Polymer Standards, Mentor, Ohio and above about 18,000, the standards were poly(ethylene oxide) standards from Polymer Laboratories, Inc., Stow, Ohio.

Data acquisition was performed with a Nelson Analytical Model 760 Interface and an IBM Personal Computer AT (IBM Corporation, Endicott, N.Y.), operating Nelson Analytical GPC Software, Version 3.6 (Nelson Analytical, Cupertino, Calif.).

As used herein, the term "high molecular weight" refers to a polymer or polymer fragments having a number average molecular weight of at least about 40,000 as determined by gel permeation chromatography. For example, high molecular weight polymer may have a number average molecular weight of from about 50,000 to about 500,000.

As used herein, the term "chain extender" refers to an aromatic or aliphatic compound capable of reacting with at least two isocyanate terminated polymers to form a polymer chain. Exemplary chain extenders may be aromatic or aliphatic compounds which are terminated with more than one hydroxyl or amine groups. If a chain extender is used to form a thermally reversible aromatic urethane bond, at least one of the functional groups of the chain extender should be a hydroxyl group attached directly to an aromatic ring.

As used herein, the term "superabsorbent" refers to absorbent materials capable of absorbing at least 10 grams of aqueous liquid (e.g. water or saline solution) per gram of absorbent material while immersed in the liquid for 4 hours and holding the absorbed liquid while under a compression force of up to about 1.5 psi.

As used herein, the term "polymer" generally includes, but is not limited to, homopolymers, copolymers, such as, for example, block, graft, random and alternating copolymers, terpolymers, etc., and blends and modifications thereof. Furthermore, unless otherwise specifically limited, the term "polymer" shall include all possible geometrical configurations of the material.

As used herein, the term "melt process" refers to methods of processing thermoplastic polymers which have been heated so they are plastic. Exemplary melt processes include melt-blowing, spun-bonding and film extrusion processes.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, the disclosure of which is hereby incorporated by reference.

As used herein, the term "microfibers" means small diameter fibers having an average diameter not greater than about 100 microns, for example, having a diameter of from about 0.5 microns to about 50 microns, or more particularly, microfibers may have an average diameter of from about 4 microns to about 40 microns. Microfibers having an average diameter less than about 0.5 microns are commonly referred to as ultrafine microfibers.

As used herein, the term "spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawing or other well-known spun-bonding mechanisms. The production of spun-bonded nonwoven webs is illustrated in patents such as, for example, in U.S. Pat. No. 4,340,563 to Appel et al., and U.S. Pat. No. 3,692,618 to Dorschner et al. The disclosures of these patents are hereby incorporated by reference.

As used herein, the term "sheet" means a layer which may either be a film or a nonwoven web.

As used herein, the term "melt flow rate" refers to the amount of material under a pressure or load that flows out of a container at a given temperature over a specified period of time. The melt flow rate is expressed in units of weight divided by time (i.e., grams/10 minutes). The melt flow rate was determined by measuring the weight of thermally reversible polymer under a 2.160 kg load that flowed through an orifice diameter of $2.0995 \pm 0.0051$ mm during a specified time period such as, for example 10 minutes at a specified temperature such as, for example, 180° C. as determined in accordance with a slightly modified version of ASTM Test Method D1238-82, "Standard Test Method for Flow Rates of Thermoplastic By Extrusion Plastometer," using a Model VE 4-78 Extrusion Plastometer (Tinius Olsen Testing Machine Co., Willow Grove, Penna.). The modifications were as follows: (1) the sample was predried at ambient temperature under reduced pressure prior to loading; (2) the piston was not preheated; (3) the sample was loaded in 2-3 minutes; and (4) the loaded sample was preheated for 5 minutes.

As used herein, the term "absorbent capacity" refers to the amount of water or aqueous solution absorbed by a superabsorbent material while immersed for 4 hours. Absorbent capacity is expressed in units of grams liquid/gram superabsorbent and is determined utilizing a centrifuge absorbent capacity and extractables test by measuring the amount of water or aqueous solution absorbed in 4 hours by a superabsorbent polymer and dividing that amount by the final weight of the dried superabsorbent polymer. The ratio used to represent absorbency may be expressed by the following equation:

$$\text{Absorbent capacity} = \left( \text{wet weight} - \begin{array}{c}\text{final}\\ \text{dry weight}\end{array} \right) / \begin{array}{c}\text{final}\\ \text{dry weight}\end{array}$$

As used herein, the term "extractables" refers to the amount of a superabsorbent polymer which is dissolved by water or an aqueous solution while immersed for 4 hours. The level of extractables is determined utilizing a centrifuge absorbent capacity and extractables test by measuring the differences in the dry weight of a superabsorbent material sample after being immersed in liquid for 4 hours. A high level of extractables in a superabsorbent polymer is typically associated with lower levels of absorbent capacity and strength. The ratio used to represent extractables may be expressed by the following equation:

$$\text{Extractables} = 100 * \left( \begin{array}{c}\text{initial}\\ \text{dry weight}\end{array} - \begin{array}{c}\text{final}\\ \text{dry weight}\end{array} \right) / \begin{array}{c}\text{initial}\\ \text{dry weight}\end{array}$$

The centrifuge absorbent capacity and extractables tests were conducted with water (W) or synthetic urine (SU). A film of thickness 0.0109 inch was made in a Carver Laboratory Hot Press at 140° C. and a pressure of 10,000 psig. The film was cut into 1-cm squares and then weighed. Each film was placed in water or synthetic urine at ambient temperature and allowed to soak for 4 hours. Excess liquid was removed from the soaked sample before it was placed into a centrifuge tube having a barrier at the bottom of the tube. The barrier was permeable only to the test liquid while the sample was being centrifuged at 1,000 rpm for 30 minutes. The sample was removed from the centrifuge tube, placed in a tared aluminum weighing dish and weighed. The sample was then dried for three hours at 90° C. and reweighed.

As used herein, the term "gel strength" refers to the response of a swollen gel to shear forces. In particular, gel strength may be represented by the shear or storage modulus G' of a swollen gel at a strain of 1% and frequency of 1 rad/sec measured using a RDS-II Rheometer (Rheometrics, Inc., Buffalo Grove, Ill.) and expressed in units of dynes/cm$^2$. The gel strength of a superabsorbent polymer may be measured using the following procedure: Twenty grams of 0.09% NaCl solution was placed in a 250 ml beaker. The solution was stirred with a magnetic stirrer while a pre-weighed amount of superabsorbent polymer was slowly added to the solution. When the stirring bar stopped moving (due to gel formation), the stirring bar was removed and the beaker was covered and left undisturbed for 1 hour. The gel was then poured from the beaker onto 10 layers of HI-DRI ™ paper towel to remove excess fluid. The gel strength was measured utilizing a RDS-II Rheometer configured with parallel plates; each plate having a diameter of 25 mm. Running rate sweeps from about 0.1 radians per second (rad/sec) up to about 100 rad/sec at a strain of 1% were used to generate dynamic rheological measurements. The shear or storage modulus G' at a strain of 1% and frequency of 1 rad/sec was recorded and represents the gel stiffness in dynes/cm$^2$.

As used herein, the term "inherent viscosity" refers to the resistance of a material in solution to flow through a capillary tube at a specific temperature. The inherent viscosity is related to the relative viscosity ($\eta_4$) which is the viscosity of the solution divided by the viscosity of the solvent (i.e., $\eta_{solution}/\eta_{solvent}$) by the equation:

$$\text{inherent viscosity} = (\ln \eta_r)/c$$

where c is the concentration of the solution expressed in grams/deciliter. Inherent viscosity typically increases as the molecular weight of a material increases. The inherent viscosity of a solid polymer is determined by dissolving the solid polymer in a compatible solvent to form a solution having a standard concentration, determining the relative viscosity, and then substituting the relative viscosity and concentration into the equation for inherent viscosity. The viscosities were determined utilizing a Schotte Gerate KPG ™ Ubbelohde Viscometer (Jenaer Glasswerk Schott & Gen., Mainz, Germany) with a suspended level bulb. A polymer sample was dissolved in m-cresol at a concentration of 0.5 g/dl. The solution was filtered through a medium frit sintered glass funnel and equilibrated for 30 min at 30° C. in a constant temperature bath (Canner Instrument Company, Boalsburg, Penna.) before measuring the rate flow.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, solvents, particulates and materials added to enhance processability of the composition.

SUMMARY OF THE INVENTION

The present invention provides superabsorbent fibers and sheets having high gel strength and high absorbent capacity, and low levels of extractables. The present invention also addresses problems associated with melt-processing high molecular weight superabsorbent polymers by providing a thermally reversible superabsorbent polymer adapted for use in melt processes, the polymer having a thermally reversible bond which is adapted to evanesce at an elevated temperature and revert to a thermally reversible bond upon cooling to ambient temperature so that the polymer is adapted, upon being heated to that elevated temperature, to dissociate into melt processable polymer fragments and, upon being cooled from that elevated temperature to ambient temperature, to re-associate.

The thermally reversible superabsorbent polymers may be melt-processed at temperatures in the range from about 155° C. to about 200° C. into fibers and/or sheets having the valuable physical properties of high molecular weight superabsorbent polymers such as high absorbent capacity and high gel strength, and low levels of extractables while having the useful melt-processing characteristics of low molecular weight polymers such as high melt flow rates at low temperatures.

According to the present invention, the thermally reversible polymer contains at least two soft segments joined by a hard segment that includes a thermally reversible bond. A thermally reversible polymer may contain additional soft segments that are united by one or more hard segments that may or may not have additional thermally reversible bonds. The thermally reversible bond should be capable of evanescing at an elevated temperature which is lower than the degradation temperature of the polymer fragments. The thermally reversible bond may be, for example, a thermally reversible aromatic urethane bond.

Polymers that have a thermally reversible aromatic urethane bond and that are used to form the fibers and sheets of the present invention typically contain from about 70 percent to about 98.5 percent, by weight, of a soft, superabsorbent segment and from about 1.5 percent to about 30 percent, by weight, of a hard segment. The soft, superabsorbent segment may be formed from at least one water soluble polymer selected from hydroxyl terminated water soluble polymers and amine terminated water soluble polymers. The hard segments that join the soft segments typically contain a thermally reversible aromatic urethane bond. Aromatic urethane bonds are formed by reaction between aromatic isocyanates and chain extenders having at least one hydroxyl group attached to an aromatic ring.

According to the present invention, superabsorbent fibers and sheets may be formed from a thermally reversible superabsorbent polymer by:

heating a thermally reversible polymer to a temperature sufficient to dissociate the polymer into polymer fragments;

passing the polymer fragments through means for forming fibers or sheets; and cooling the fibers or sheets to re-associate the polymer fragments.

Other aspects of the invention provide that superabsorbent fibers and sheets may be formed from polymers having hard segments that include para-substituted phenylene chain extenders such as, for example, para-substituted diols or systems including one or more para-hydroxyl substituted phenylene groups. The polymers may also be adapted to form chemical cross-links that are chemically stable and solvent resistant. Cross-linking may be accomplished by utilizing a trifunctional chain extender having at least one hydroxyl group attached to an aromatic ring and having other functional groups capable of reacting with an isocyanate which are not attached to the aromatic ring. For example, cross-linking may be accomplished utilizing aromatic triols having at least one hydroxyl group that is not attached to the aromatic ring. Mixtures aliphatic triols and aromatic diols may also be used.

DETAILED DESCRIPTION OF THE INVENTION

Figure 1:
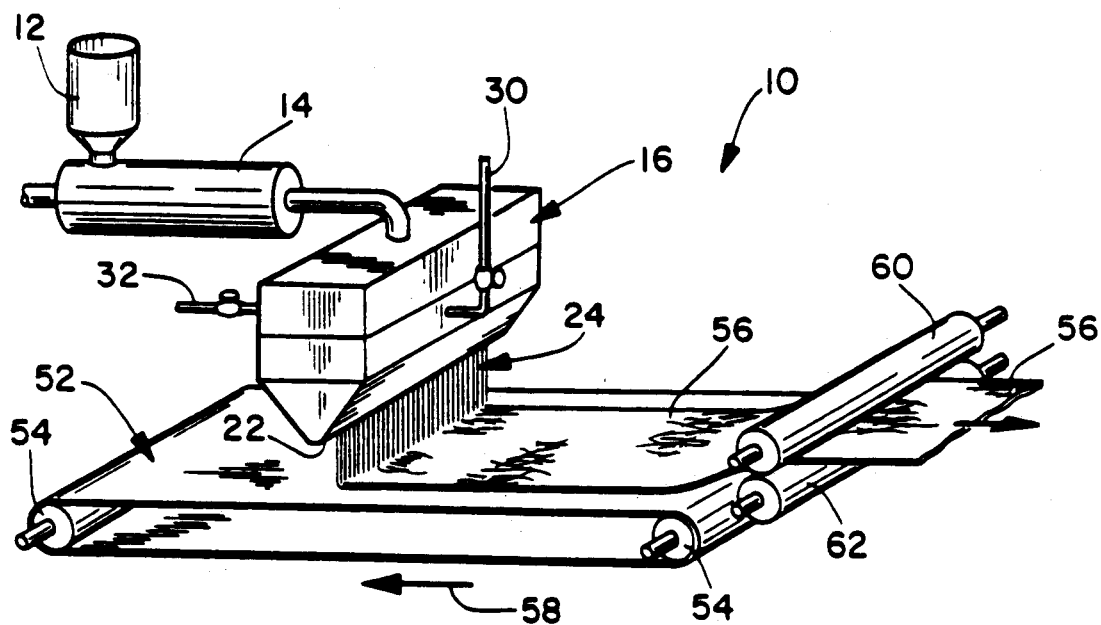
FIG. 1 is a schematic illustration of an apparatus which may be used to form a nonwoven web of thermally reversible polymer fibers.

Fibers or sheets may be may from a thermally reversible superabsorbent polymer by:

heating a thermally reversible polymer to a temperature sufficient to dissociate the polymer into polymer fragments;

passing the polymer fragments through means for forming fibers or sheets; and cooling the polymer fragment fibers or sheets to reassociate the polymer fragments.

The dissociation temperature of the thermally reversible polymer should be less than the degradation temperature of the polymer fragments. Temperatures at or slightly above the degradation temperature may be used to reduce the viscosity of the polymer to very low levels to make materials such as, for example, ultrafine microfibers. Fiber or sheet forming means may be, for example, meltblowing processes, spunbonding processes, and film extrusion processes.

The thermally reversible superabsorbent polymer of the present invention contains at least two soft segments joined by a hard segment that includes a thermally reversible bond. The polymer may contain additional soft segments that are united by one or more hard segments that may or may not have additional thermally reversible bonds. Each segment is described herein using segment components and by general formula. The hard segments having a thermally reversible bond may contain a thermally reversible aromatic urethane bond. When the thermally reversible superabsorbent polymer contains hard segments including thermally reversible aromatic urethane bonds, the polymer may have the following general formula:

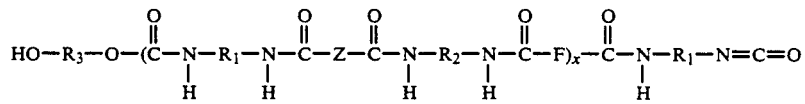

wherein $R_1$ is selected from aliphatic and aryl groups;

wherein $R_2$ is selected from aliphatic and aryl groups so that said polymer has at least one $R_2$ which is an aryl group having from 6 to about 18 carbon atoms such as, for example, phenyl, biphenyl and naphthyl; and x is an integer greater than 2; and Z represents a soft segment.

The soft segment Z typically represents from about 70 percent to about 98.5 percent, by weight, of the total composition. For example, the soft segment may represent from about 80 percent to about 95 percent, by weight, of the composition. The soft segment may be described, for example, by the following formula:

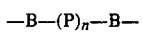

where B is selected from oxygen, nitrogen, and sulfur;

P is a water-swellable polymer such as, for example, polyethylene glycol, polyethylene oxides, polypropylene oxides and copolymers of the above; and n is an integer of from 3 to 500 so that the water soluble polymer forming the soft segment has a molecular weight greater than about 300, for example from about 300 to about 25,000 as determined by gel permeation chromatography.

The hard segment of the thermally reversible superabsorbent polymer typically represents from about 1.5 percent to about 30 percent, by weight, of the composition. For example, the hard segment may represent from about 2 percent to about 15 percent, by weight, of the composition.

When the hard segment of the thermally reversible polymer includes a thermally reversible aromatic urethane bond, component F of the thermally reversible polymer depicts the chain extender portion of the hydroxyl portion of the urethane bond and may be represented by the following formulas:

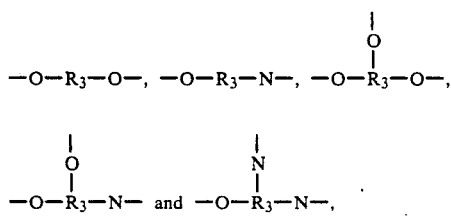

where $R_3$ is an aromatic group selected from, for example, sulfonyldiphenyl, amino phenyl, benzoic acid, phenyl acetic acid, thiodiphenyl, methyl phenyl, phenyl, biphenyl, and naphthyl.

Although the formula for component F depicts all the oxygen and/or nitrogen atoms pendant from the aromatic compound, only the oxygen atom which joins with the isocyanate to form the urethane bond needs to be pendant to the aromatic groups in order to form a thermally reversible bond. The other oxygen and/or nitrogen atoms may be separated from the aromatic group by segments such as, for example, saturated and unsaturated alkyl chains and saturated and unsaturated cycloalkyl chains.

The aromatic group $R_3$ may be substituted with one or more electron donating substituents or electron withdrawing substitutents. Electron donating or electron withdrawing substituents affect the temperature at which the aromatic urethane bond evanesces and reverts. Although the inventors should not be held to a particular theory of operation, it is believed that the electron withdrawing substituents lower the temperature at which the thermally reversible aromatic urethane bond evanesces resulting in higher melt flow rates and lower processing temperatures for polymers containing such a thermally reversible bond. However, strong electron withdrawing substituents appear to diminish the rapid reversion of the evanesced bonds. Such an effect may be unsuitable in melt-processes where rapid formation of a polymer film, fiber or other material is desired. Exemplary electron withdrawing substituents include nitro groups, sulfonyl groups, cyano groups, acetyl groups, esters, and amides.

Electron donating substituents are believed to increase the temperature at which the aromatic urethane bond evanesces and increase the rapid reversion of evanesced bonds. Those substituents can be used to adjust the melt flow rate for a given processing temperature as well as to enhance the rapid formation of films, fibers or other products made of polymers containing such a substituted thermally reversible bond. Exemplary electron donating substituents include alkoxy groups, alkyl groups, halides and tertiary amines.

The relation between the electron withdrawing or donating substituents of aromatic component F and the evanescence and reversion of thermally reversible aromatic urethane bonds is described to illustrate that polymers may be developed to suit the requirements of particular melt-processing methods such as, for example, melt-blowing processes, spun-bonding processes and film extruding processes. For example, polymers having low evanescence temperatures, high melt flow rates and rapid reversion of evanesced bonds may be desirable for many processes that produce polymer fibers such as, for example, melt-blowing or spun-bonding processes.

When the thermally reversible polymer contains a thermally reversible aromatic urethane bond, the reversible bonds may be formed by reacting an aromatic multifunctional isocyanate with an aromatic compound having at least one hydroxyl group attached to the aromatic ring. Generally speaking, most aromatic diols and/or triols, substituted aromatic diols and/or triols, mixed aromatic aliphatic alcohols, aromatic alcohols/amines, aromatic alcohols/thiols, and aromatic alcohols/carboxylic acids could be reacted with many aromatic isocyanates to generate the thermally reversible urethane bond.

Polymers containing thermally reversible urethane bonds are typically prepared by (1) reacting a hydroxyl terminated or amine terminated water soluble polymer with an aromatic multifunctional isocyanate; and (2) reacting the product from the first step with a chain extender having at least two functional groups capable of reacting with the isocyanate, at least one of the functional groups being a hydroxyl group attached to an aromatic ring.

Exemplary hydroxyl-terminated water soluble polymers include polyethylene glycols having molecular weights of 3500, 8000, 14,000, and 20,000 available from the Union Carbide Corporation under the trade designation Carbowax. Other useful hydroxyl-terminated water soluble polymers include, for example, polyethylene oxides, polypropylene oxides and copolymers of the same. Exemplary amine-terminated water soluble polymers include amine-terminated polyethylene oxides.

The water soluble polymers making up the soft segment may have a number average molecular weight ($M_n$) in the range from about 8,000 to about 20,000, as determined by gel permeation chromatography. For example, the water soluble polymers making up the soft segment may have molecular weights in the range from about 9,500 to about 15,000.

Aromatic multifunctional isocyanates found to be useful include, for example, toluene-2,4-diisocyanate, toluene-2,6-diisocyanate, 4,4'-methylene- bis(-phenylisocyanate), m-phenylene diisocyanate, 4,4'-biphenylene diisocyanate, 3,3'-dichloro-4,4'biphenylene diisocyanate, xylene diisocyanate, chlorophenylene diisocyanate, diphenylmethane-4,4'-diisocyanate, or naphthalene-1,5-diisocyanate.

In the second reaction, the mole ratio of the first reaction product to aromatic chain extender is in the range from about 2 to about 100. This second reaction may be carried out at temperatures in the range from about 80° to 200° C. Typically, the reaction temperature will be from about 90° to about 150° C., for example, from about 110° to about 130° C. Reaction times depend upon reaction temperature and may range, for example, from about 1 to about 4 hours.

The aromatic chain extender utilized in the second reaction should have at least two functional groups capable of reacting with the isocyanate and at least one of those groups should be a hydroxyl group attached directly to an aromatic ring. Parasubstituted phenylene compound have been found to work well. Exemplary para-substituted phenylene diol chain extenders include hydroquinone, methylhydroquinone, phenylhydroquinone, acetyl hydroquinone, 4,4'-isopropylidenediphenol, chlorohydroquinone, biphenol, methylene bisphenol and thiodiphenol. Derivatives of para-substituted phenylene compounds such as, for example, 4-amino phenol, 4-hydroxylbenzoic acid, 4-hydroxyl phenyl acetic acid and 4-hydroxylbenzyl alcohol, may also be used as chain extenders. The chain extender may also include aromatic compounds having at least one hydroxyl group attached directly to an aromatic ring and one or more amino groups such as, for example, 2,4-dihydroxyl-N-(2-hydroxylethyl) benzamide.

Mixtures of 1,4-phenylene substituted chain extenders or 1,4-phenylene substituted derivatives and other aromatic and/or aliphatic diols may also be used. For example, polymers may be prepared utilizing a mixture of 1,4-dihydroxyl benzene and 1,3-dihydroxyl benzene chain extenders. Although the inventors should not be held to a particular theory of operation, it is believed that chain extenders which include para-substituted phenylene compounds or ring systems having one or more para-substituted phenylene groups increase the degree of crystallinity of the resulting polymer causing distinct phase separation between the hard and soft segments. It is believed that phase separation results in a more rigid or crystalline hard segment which permits the water soluble soft segment to absorb water without dissolving. Generally speaking, mixtures containing more than 50% by weight parasubstituted phenylene compounds or ring systems having one or more parasubstituted phenylene groups result in polymers having high absorbent capacity and high gel strength, and low extractables.

Conventional thermoplastic superabsorbent materials may swell excessively or dissolve in liquids such as, for example, water, aqueous solutions, tetrahydrofuran, acetone and halogenated hydrocarbons having from 1 to 6 carbon atoms. The thermally reversible superabsorbent polymers of the present invention may be adapted to form chemical cross-links which are chemically stable and solvent resistant. Cross-linked materials may be produced by utilizing a trifunctional chain extender having at least one hydroxyl group attached to an aromatic ring and having other functional groups not attached to the aromatic ring which are capable of reacting with an isocyanate. Suitable trifunctional chain extenders include, for example, 1,3,5-trihydroxylbenzene, 3,5-bis (hydroxylethoxy) phenol, and 2,4-dihydroxyl-N-(2-hydroxylethyl) benzamide. Mixtures of aromatic trifunctional chain extenders and aliphatic trifunctional chain extenders may also be used.

The molecular weight of the thermally reversible polymers may range from about 40,000 to about 500,000. For example, from about 50,000 to about 75,000. Thermally reversible polymers have melt flow rates that may range, for example, from about 450 grams per 10 minutes to about 1000 grams per 10 minutes because the thermally reversible aromatic urethane bonds evanesce above certain temperatures resulting in small, melt processable polymer fragments having molecular weights ranging from about 8,000 to about 25,000 which provide good melt flow characteristics. Conventional thermoplastic superabsorbent polymers may be formulated to provide similar melt flow rates but such low molecular weight polymers have very low strengths.

Turning now to the figures wherein like reference numerals represent the same or equivalent structure and, in particular, to FIG. 1 where it can be seen that an apparatus for forming a nonwoven web of meltblown thermally reversible superabsorbent polymer fibers of the present invention is schematically generally represented by reference numeral 10. In forming the fibers and nonwoven web of the present invention, pellets or chips, etc. (not shown) of a thermally reversible superabsorbent polymer are introduced into a pellet hopper 12 of an extruder 14.

The extruder 14 has an extrusion screw (not shown) which is driven by a conventional drive motor (not shown). As the thermally reversible polymer advances through the extruder 14, due to rotation of the extrusion screw by the drive motor, it is progressively heated to a molten state where the thermally reversible bonds evanesce and polymer fragments are formed. Heating the thermally reversible superabsorbent polymer to the molten state may be accomplished in a plurality of discrete steps with its temperature being gradually elevated as it advances through discrete heating zones of the extruder 14 toward a meltblowing die 16. The die 16 may be yet another heating zone where the temperature of the thermoplastic resin is maintained at an elevated level for extrusion. The temperature which will be required to heat the thermally reversible polymer to a molten state will vary depending upon factors such as, for example, the type of polymers between the thermally reversible bonds, presence of electron withdrawing or electron donating substituents on the aromatic chain extender, and addition of cross-linking agents to the thermally reversible superabsorbent polymer.

Generally speaking, typical thermally reversible superabsorbent polymers may be extruded within the temperature range of from about 150 degrees Centigrade to about 200 degrees Centigrade. For example, the extrusion may be accomplished within a temperature range of from about 170 degrees Centigrade to about 190 degrees Centigrade. Heating of the various zones of the extruder 14 and the meltblowing die 16 may be achieved by any of a variety of conventional heating arrangements (not shown).

Figure 2:
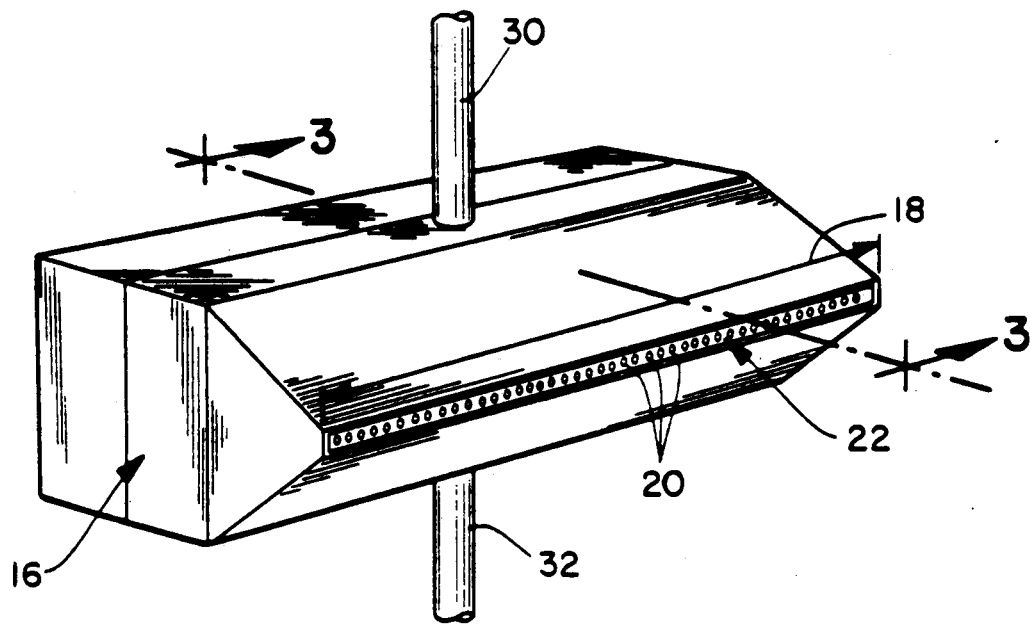
FIG. 2 is a bottom view of the die of FIG. 1 with the die having been rotated 90 degrees for clarity.

FIG. 2 illustrates that the lateral extent 18 of the die 16 is provided with a plurality of orifices 20 which are usually circular in cross-section and are linearly arranged along the extent 18 of the tip 22 of the die 16. The orifices 20 of the die 16 may have diameters that range from about 0.01 inches to about 0.20 inches. For example, the orifices may have a diameter of about 0.0145 inches and a length of about 0.113 inches. Orifices having a diameter even less than 0.01 inches may also be used because of the very low viscosities of the thermally reversible polymers. For example, orifices having a diameter of about 0.005 inches may be used to produce ultrafine microfibers. From about 5 to about 50 orifices may be provided per inch of the lateral extent 18 of the tip 22 of the die 16 with the die 16 extending from about 30 inches to about 60 inches or more. It is desirable to use fewer than 5 orifices per inch when the orifices have a diameter of less than 0.01 inches to avoid pressure damage to the die tip. FIG. 1 illustrates that the molten thermally reversible polymer fragments emerge from the orifices 20 of the die 16 as molten strands or threads 24.

Figure 3:
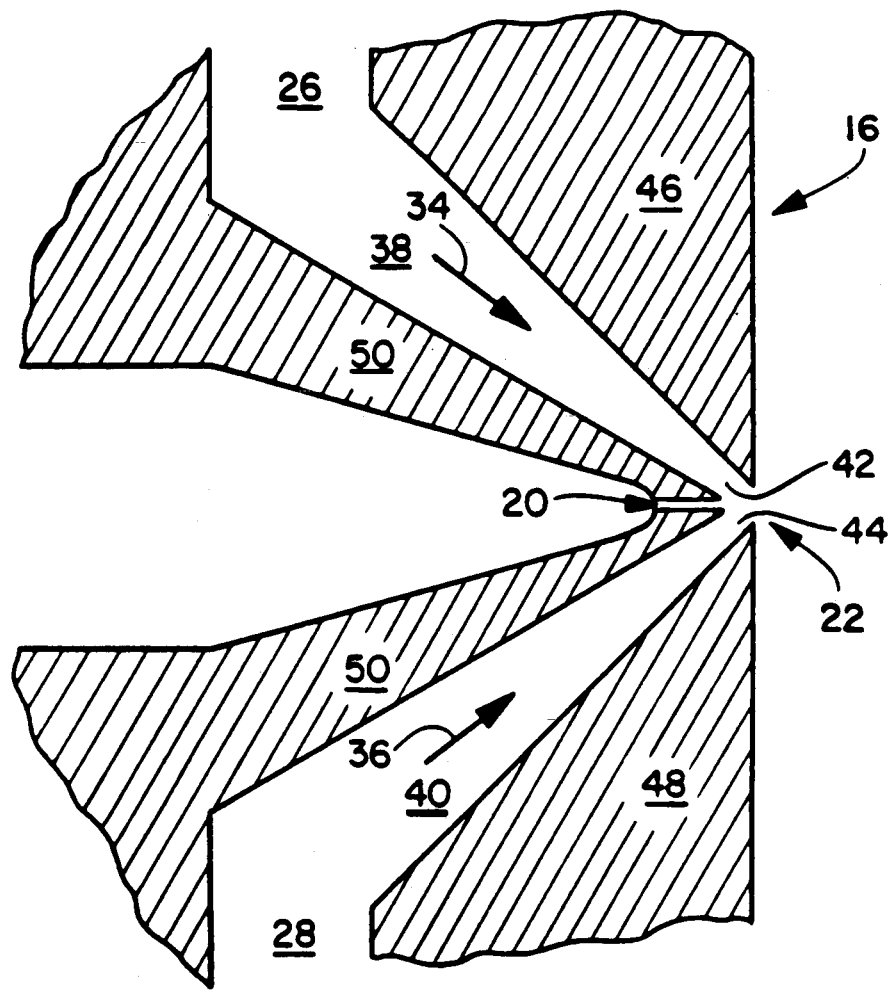
FIG. 3 is a cross-sectional view of the die of FIG. 1 taken along line 3—3 of FIG. 2.

FIG. 3, which is a cross-sectional view of the die of FIG. 2 taken along line 3—3, illustrates that the die 16 preferably includes attenuating gas inlets 26 and 28 which are provided with heated, pressurized attenuating gas (not shown) by attenuating gas sources 30 and 32. (See FIGS. 1 and 2.) The heated, pressurized attenuating gas enters the die 16 at the inlets 26 and 28 and follows a path generally designated by the arrows 34 and 36 through the two chambers 38 and 40 and on through the two narrow passageways or gaps 42 and 44 so as to contact the extruded threads 24 as they exit the orifices 20 of the die 16. The chambers 38 and 40 are designed so that the heated attenuating gas passes through the chambers 38 and 40 and exits the gaps 42 and 44 to form a stream (not shown) of attenuating gas which exits the die 16 on both sides of the threads 24. The temperature and pressure of the heated stream of attenuating gas can vary widely. For example, the heated attenuating gas can be applied at a temperature of from about 155 degrees Centigrade to about 200 degrees Centigrade, more particularly, from about 175 degrees Centigrade to about 190 degrees Centigrade. The heated attenuating gas may generally be applied at a pressure of from about 0.5 pounds per square inch, gage to about 20 pounds per square inch gage. More particularly, from about 1 pound per square inch, gage to about 5 pounds per square inch, gage.

The position of air plates 46 and 48 which, in conjunction with a die portion 50 define the chambers 38 and 40 and the gaps 42 and 44, may be adjusted relative to the die portion 50 to increase or decrease the width of the attenuating gas passageways 42 and 44 so that the volume of attenuating gas passing through the air passageways 42 and 44 during a given time period can be varied without varying the velocity of the attenuating gas. Furthermore, the air plates 46 and 48 may be adjusted to effect a "recessed" die-tip configuration as illustrated in FIG. 3 or a positive die-tip 22 stick-out where the tip of die portion 50 protrudes beyond the plane formed by the plates 48. Generally speaking, a positive die-tip stick-out configuration and attenuating gas pressures of less than 5 pounds per square inch, gage are used in conjunction with air passageway widths, which are usually the same and are no greater in width than about 0.110 inches. Lower attenuating gas velocities and wider air passageway gaps are generally preferred if substantially continuous meltblown fibers or microfibers 24 are to be produced.

The two streams of attenuating gas converge to form a stream of gas which entrains and attenuates the molten threads 24, as they exit the orifices 20, into fibers or, depending upon the degree of attenuation, microfibers, of a small diameter which is usually less than the diameter of the orifices 20. The gas-borne fibers or microfibers 24 are blown, by the action of the attenuating gas, onto a collecting arrangement which, in the embodiment illustrated in FIG. 1, is a foraminous endless belt 52 conventionally driven by rollers 54. The fibers or microfibers 24 are collected as a coherent matrix of fibers on the surface of the endless belt 52 which is rotating as indicated by the arrow 58 in FIG. 1. The vacuum boxes assist in retention of the matrix on the surface of the belt 52. Typically the tip 22 of the die 16 is from about 6 inches to about 14 inches from the surface of the foraminous belt 52 upon which the fibers are collected. The thus-collected, entangled fibers or microfibers 24 are coherent and may be removed from the belt 52 as a self-supporting nonwoven web 56 by a pair of pinch rollers 60 and 62 which may be designed to pres the fibers of the web 56 together to improve the integrity of the web 56.

Figure 4:
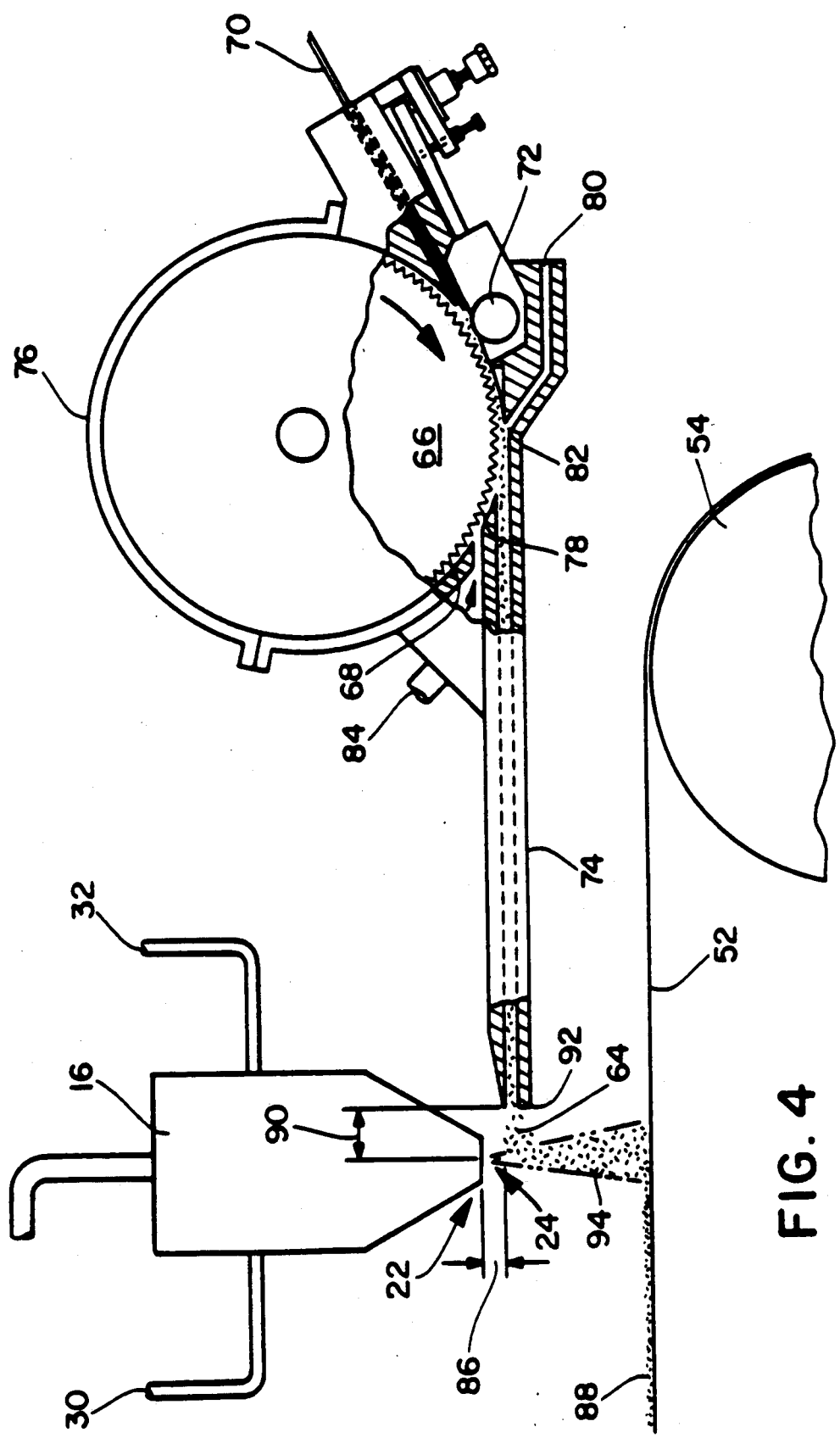
FIG. 4 is a schematic illustration of an apparatus which may be used to form an embodiment of the present invention where secondary fibers are incorporated into a matrix of thermally reversible polymer fibers to form a coherent nonwoven web.

FIG. 4 illustrates another embodiment of the present invention where one or more types of secondary fibers 64 are distributed within or upon the stream of thermally reversible superabsorbent polymer fibers or microfibers 24. Distribution of the secondary fibers 64 within the stream of thermally reversible polymer fibers 24 may be such that the secondary fibers 64 are generally uniformly distributed throughout the stream of thermally reversible polymer fibers 24. This may be accomplished by merging a secondary gas stream (not shown) containing the secondary fibers 64 with the stream of fibers 24. Apparatus for accomplishing this merger may include a conventional picker roll 66 arrangement which has a plurality of teeth 68 that are adapted to separate a mat or batt 70 of secondary fibers into the individual secondary fibers 64. The mat or batt of secondary fibers 70 which is fed to the picker roll 66 may be a sheet of pulp fibers (if a two-component mixture of thermally reversible polymer fibers and secondary pulp fibers is desired), a mat of staple fibers (if a two-component mixture of thermally reversible polymer fibers and a secondary staple fibers is desired) or both a sheet of pulp fibers and a mat of staple fibers (if a three-component mixture of thermally reversible polymer fibers, secondary staple fibers and secondary pulp fibers is desired). In embodiments where, for example, an absorbent material is desired, the secondary fibers 64 are absorbent fibers. The secondary fibers 64 may generally be selected from the group including one or more polyester fibers, polyamide fibers, cellulosic derived fibers such as, for example, rayon fibers and wood pulp fibers, multi-component fibers such as, for example, sheath-core multi-component fibers, natural fibers such as silk fibers, wool fibers or cotton fibers or electrically conductive fibers or blends of two or more of such secondary fibers. Other types of secondary fibers 64 such as, for example, polyethylene fibers and polypropylene fibers, as well as blends of two or more of other types of secondary fibers 64 may be utilized. The secondary fibers 64 may be microfibers or the secondary fibers 64 may be macrofibers having an average diameter of from about 300 microns to about 1,000 microns.

The sheets or mats 70 of secondary fibers 64 are fed to the picker roll 66 by a roller arrangement 72. After the teeth 68 of the picker roll 66 have separated the mat of secondary fibers 70 into separate secondary fibers 64 the individual secondary fibers 64 are conveyed toward the stream of thermally reversible polymer fibers or microfibers 24 through a nozzle 74. A housing 76 encloses the picker roll 66 and provides a passageway or gap 78 between the housing 76 and the surface of the teeth 68 of the picker roll 66. A gas (not shown), for example, air, is supplied to the passageway or gap 78 between the surface of the picker roll 66 and the housing 76 by way of a gas duct 80. The gas duct 80 may enter the passageway or gap 78 generally at the junction 72 of the nozzle 74 and the gap 78. The gas is supplied in sufficient quantity to serve as a medium for conveying the secondary fibers 64 through the nozzle 74. The gas supplied from the duct 80 also serves as an aid in removing the secondary fibers 64 from the teeth 68 of the picker roll 66. However, gas supplied through the duct 84 generally provides for the removal of the secondary fibers 64 from the teeth of the picker roll 66. The gas may be supplied by any conventional arrangement such as, for example, an air blower (not shown).

Generally speaking, the individual secondary fibers 64 are conveyed through the nozzle 74 at generally the velocity at which the secondary fibers 64 leave the teeth 68 of the picker roll 66. In other words, the secondary fibers 64, upon leaving the teeth 68 of the picker roll 66 and entering the nozzle 74 generally maintain their velocity in both magnitude and direction from the point where they left the teeth 68 of the picker roll 66. Such an arrangement, which is discussed in more detail in U.S. Pat. No. 4,100,324 to Anderson, et al., hereby incorporated by reference, aids in substantially reducing fiber floccing.

As an aid in maintaining satisfactory secondary fiber 64 velocity, the nozzle 74 may be positioned so that its longitudinal axis is substantially parallel to a plane which is tangent to the picker roll 66 at the junction 72 of the nozzle 74 with the passageway 78. As a result of this configuration, the velocity of the secondary fibers 64 is not substantially changed by contact of the secondary fibers 64 with the walls of the nozzle 74. If the secondary fibers 64 temporarily remain in contact with the teeth 68 of the picker roll 66 after they have been separated from the mat or batt 70, the axis of the nozzle 74 may be adjusted appropriately to be aligned with the direction of secondary fiber 64 velocity at the point where the secondary fibers 64 disengage from the teeth 68 of the picker roll 66. The disengagement of the secondary fibers 64 from the teeth 68 of the picker roll 66 may be assisted by application of a pressurized gas, i.e., air through duct 84.

The vertical distance 86 that the nozzle 74 is below the die tip 22 may be adjusted to vary the properties of the composite web 88. Variation of the horizontal distance 90 of the tip 92 of the nozzle 74 from the die tip 24 will also achieve variations in the final nonwoven web 88. The vertical distance 86 and the horizontal distance 90 values will also vary with the material being added to the thermally reversible polymer fibers 24. The width of the nozzle 74 along the picker roll 66 and the length that the nozzle 74 extends from the picker roll 66 are also important in obtaining optimum distribution of the secondary fibers 64 throughout the stream of fibers 24. It is usually desirable for the length of the nozzle 74 to be as short as equipment design will allow. The length is usually limited to a minimum length which is generally equal to the radius of the picker roll 66. Usually, the width of the nozzle 74 should not exceed the width of the sheets or mats 70 that are being fed to the picker roll 66.

The picker roll 66 may be replaced by a conventional particulate injection system to form a composite nonwoven web 88 containing various secondary particulates. A combination of both secondary particulates and secondary fibers could be added to the thermally reversible polymer fibers prior to formation of the composite nonwoven web 88 if a conventional particulate injection system was added to the system illustrated in FIG. 4. The particulates may be, for example, hydrocolloid (hydrogel) particulates commonly referred to as super-absorbents.

FIG. 4 further illustrates that the gas stream carrying the secondary fibers 64 is moving in a direction which is generally perpendicular to the direction of movement of the stream of thermally reversible polymer fibers 24 at the point of merger of the two streams. Other angles of merger of the two streams may be utilized. The velocity of the gas stream of secondary fibers 64 is usually adjusted so that it is less than the velocity of the stream of thermally reversible polymer fibers 24. This allows the streams, upon merger and integration thereof to flow in substantially the same direction as that of the stream of thermally reversible polymer fibers 24. Indeed, the merger of the two streams may be accomplished in a manner which is somewhat like an aspirating effect where the stream of secondary fibers 64 is drawn into the stream of thermally reversible polymer fibers 24. If desired, the velocity difference between the two gas streams may be such that the secondary fibers 64 are integrated into the thermally reversible polymer fibers 24 in a turbulent manner so that the secondary fibers 64 become substantially thoroughly and uniformly mixed throughout the thermally reversible polymer fibers 24. Generally, for increased production rates the gas stream which entrains and attenuates the stream of thermally reversible polymer fibers 24 should have a comparatively high initial velocity, for example, from about 200 feet to over 1,000 feet per second, and the stream of gas which carries the secondary fibers 64 should have a comparatively low initial velocity, for example, from about 50 to about 200 feet per second. After the stream of gas that entrains and attenuates the thermally reversible polymer fibers 24 exits the gaps 42 and of the die 16, it immediately expands and decreases in velocity.

Upon merger and integration of the stream of secondary fibers 64 into the stream of thermally reversible polymer fibers 24 to generally uniformly distribute the secondary fibers 64 throughout the stream of thermally reversible polymer fibers 24, a composite stream 96 of thermoplastic fibers 24 and secondary fibers 64 is formed. Due to the fact that the thermally reversible polymer fibers 24 are usually still semi-molten and tacky at the time of incorporation of the secondary fibers 64 into the thermally reversible polymer fibers 24, the secondary fibers 64 are usually not only mechanically entangled within the matrix formed by the thermally reversible polymer fibers 24 but are also thermally bonded or joined to the thermally reversible polymer fibers 24.

In order to convert the composite stream 96 of thermally reversible polymer fibers 24 and secondary fibers 64 into a composite nonwoven web or mat 88 composed of a coherent matrix of the thermally reversible polymer fibers 24 having the secondary fibers 64 generally uniformly distributed therein, a collecting device is located in the path of the composite stream 96. The collecting device may be the endless belt 52 of FIG. 1 upon which the composite stream 96 impacts to form the composite nonwoven web 56. The belt 52 is usually present. other collecting devices are well known to those of skill in the art and may be utilized in place of the endless belt 52. For example, a porous rotating drum arrangement could be utilized. Thereafter, the composite nonwoven web 88 is removed from the screen by the action of rollers such as roller 60 and 62 as shown in FIG. 1.

EXAMPLES

The polymers produced in Examples 1, 3, 5, and 7, a control polymer and an acrylate superabsorbent (Dow Dry Tech TM Dow Chemical Company, Midland, Mich.) was characterized by determining the Inherent Viscosity, Melt Flow Rate, Gel Strength, Absorbent Capacity, and Extractables. The Inherent Viscosity and Melt Flow Rate are reported in Table 1 and the Absorbent Capacity, Extractables, and Gel Strength are reported in Table 2.

Example 1 Synthesis of superabsorbent polymers containing Thermally Reversible Bonds.

A three necked resin kettle equipped with nitrogen inlet and thermometer was charged with 210 g (0.015 mole) of poly(oxyethylene) diol having a molecular weight of 14000 (Carbowax TM, Union Carbide Corp., South Charleston, W.V. and 10 g (0.04 mole) of 4,4'-methylenebis(phenylisocyanate) aromatic multifunctional isocyanate (Eastman Kodak Co., Rochester, N.Y.). The mixture was stirred for 2 hr at 110° C. and then 3 g (0.015 mole) of hydroquinone bis(2-hydroxylethoxy) ether aromatic chain extender and 1.1 g (0.01 mole) of resorcinol (3-hydroxyl phenol) aromatic chain extender (Aldrich Chemical, Milwaukee, Wis.) were added to the reaction mixture. The mixture was heated at 150° C. for 2 hours and then poured into a Teflon TM coated pan. This polymer contained 4.6%, by weight, hard segment and 95.4%, by weight, soft segment.

Example 2

The procedure of Example 1 was repeated, except that resorcinol was replaced with methylhydroquinone aromatic chain extender. This polymer contained 4.6%, by weight, hard segment and 95.4%, by weight, soft segment.

Example 3

The procedure of Example 2 was repeated, except that only methylhydroquinone was used as the aromatic chain extender. The amounts used were:

210.0 g (0.015 mole) of poly(oxyethylene) diol; 7.5 g (0.03 mole) of 4,4'-methylenebis (phenylisocyanate); and
1.9 g (0.015 mole) of methylhydroquinone.

This polymer contained 2.5%, by weight, hard segment and 97.5%, by weight, soft segment.

Example 4 Synthesis of a superabsorbent polyetherurethaneurea with the urea linkage at the soft segment.

A 500-ml four necked cover resin kettle was charged with a dried mixture of 280 g (0.02 mole) of poly(oxyethylene) diol having a molecular weight of 14,000 and 16 g (0.008 mole) of poly(oxyethylene) diamine having a molecular weight of 2,000, (Jeffamine ™ ED 2000, Texaco Chemical Company, Bellaire, Tex.).

Approximately 16.7 g (0.067 mole) of 4,4'-methylenebis (phenylisocyanate) aromatic multifunctional diisocyanate was added to this mixture which was stirred for 1.5 hr at 110° C. At this point, 3.7 g (0.03 mole) of methylhydroquinone aromatic chain extender and 1.8 g (0.009 mole) of hydroquinone bis(2-hydroxylethoxy) ether aromatic chain extender were added to the mixture which was stirred vigorously at 110° C. for 5 minutes to enhance mixing. The resulting polymer was poured into a Teflon ™ coated pan and introduced into a vacuum oven preheated to 150° C. It was allowed to react further in this oven for 3 hr. This polymer contained 4.8%, by weight, hard segment and 95.2%, by weight, soft segment.

Example 5 Synthesis of a superabsorbent polyetherurethaneurea with the urea linkage at the hard segment.

The procedure used in Example 5 was repeated except for the following changes in the amounts and/or types of reactants:

350.0 g (0.025 mole) of poly(oxyethylene) diol;
10.0 g (0.04 mole) of 4,4'-methylenebis(phenylisocyanate);
1.6 g (0.015 mole of 4-aminophenol (chain extender).

The resulting polymer contained 1.5%, by weight, hard segment and 98.5%, by weight, of soft segment.

Example 6

The procedure used in Example 5 was repeated except for the following changes in the amounts and/or type of reactants:

200.0 g (0.025 mole) of poly(oxyethylene) diol of 8,000 molecular weight;
10.6 g (0.0425 mole) of 4,4'-methylenebis(phenylisocyanate);
1.1 g (0.01 mole) of 4-aminophenol (chain extender); and
1.5 g (0.0075 mole) of hydroquinone bis(2-hydroxylethoxy) ether (chain extender).

The resulting polymer contained 3.3%, by weight, hard segment and 96.7%. by weight, soft segment.

Example 7

The procedure of Example 6 was scaled up to produce 10 lb batches using appropriate amounts poly(oxyethylene) diol of molecular weight 8,000, 4,4'-methylenebis(phenylisocyanate), 4-aminophenol, and hydroquinone bis(2-hydroxylethoxy) ether.

Comparative Example 1 (Control) Synthesis of a superabsorbent polymer having non-thermally reversible bonds.

A 500-ml wide mouth, two piece resin kettle with ground glass flanges and a four-necked cover was charged with 214 g (0.015 mole) of a poly(oxyethylene) diol having a molecular weight of 14,000 (CARBOWAX PEG-14,000 Union Carbide Corporation, South Charleston, W.V.) and 10.5 g (0.042 mole) of 4,4'-methylenebis(phenylisocyanate) (Eastman Kodak Co., Rochester, N.Y.). The cover was attached and fitted with a nitrogen inlet, thermometer, condenser and high torque mechanical stirrer (Caframa, Type RZR50, CSA Wiarton, Ontario, Canada; Fisher Catalog No. 14-500 Fisher Scientific, Pittsburgh, Penna.). The kettle was flushed with nitrogen and maintained under a nitrogen atmosphere. The reaction mixture was heated to 100 degrees over a one-hour period and maintained at that temperature with stirring for one hour. The kettle then was charged with 2.43 g (0.027 mole) of 1,4-butanediol (J.T. Baker Chemical Company, Phillipsburg, N.J.). Stirring and heating at 100 degrees were continued for about 83 minutes, during which time the viscosity of the reaction mixture increased to the point where the mixture began to climb up the shaft of the stirrer. The reaction began to climb up the shaft of the stirrer. The reaction mixture was cooled, removed from the kettle, and stored. The polymer obtained consisted of 97.3 percent by weight soft segment and 2.7 percent by weight hard segment.

TABLE 1
PHYSICAL PROPERTIES OF SUPERABSORBENT POLYMERS

| EXAMPLES | INHERENT VISCOSITY | MELT FLOW RATE (190° C.) |
|---|---|---|
| Control | 0.57 | 95 |
| 1 | 0.61 | 480 |
| 3 | 0.48 | 546 |
| 5 | 0.43 | 380 |
| 7 | 0.74 | 545 |

TABLE 2
ABSORBENT PROPERTIES OF SUPERABSORBENT POLYMERS

| EXAMPLES | ABSORBENT CAPACITY (g/g SU)(b) | EXTRACTABLES (%) | GEL STRENGTH(a) |
|---|---|---|---|
| Control | 25 | 30 | 36,270 |
| Control(c) | 50 | 10 | 45,585 |
| 1 | 27 | 5 | — |
| 3 | 42 | 3.5 | 86,650 |
| 5 | 56 | 8 | 75,050 |
| 7 | 32 | 2.5 | 79,500 |

(a)unit in dynes/cm$^2$
(b)Synthetic Urine
(c)acrylate superabsorbent, Dow Dry Tech ™.

RELATED APPLICATIONS

This application is one of a group of commonly assigned patent applications which are being filed on the same date. The group includes the present application; application Ser. No. 07/341,457 in the name of F. C. Onwumere et al., and entitled "Thermally Reversible Polymer Sheets and Methods of Forming the Same"; and application Ser. No. 07/341,513 entitled "Thermally Reversible Polymers" and also in the name of F. C. Onwumere et al. The subject matter of these applications is hereby incorporated by reference.

Disclosure of the presently preferred embodiment of the invention is intended to illustrate and not to limit the invention. It is understood that those of skill in the art should be capable of making numerous modifications without departing from the true spirit and scope of the invention.

What is claimed is:

1. A superabsorbent polymer adapted for use in melt processes, said polymer having a thermally reversible bond which is adapted to evanesce at an elevated temperature and revert to a thermally reversible bond upon cooling to ambient temperature so that said polymer is adapted, upon being heated to said elevated temperature, to dissociate into melt processable polymer fragments and, upon being cooled from said elevated temperature to ambient temperature, to re-associate.

2. The polymer of claim 1 wherein said thermally reversible bond is an aromatic urethane bond.

3. The polymer of claim 1 wherein said elevated temperature is less than the degradation temperature of the polymer fragments.

4. The polymer of claim 1 wherein said polymer fragments have a higher melt flow rate than the re-associated polymer.

5. A superabsorbent thermally reversible polymer adapted for use in melt processes comprising:
   from about 70 percent to about 98.5 percent, by weight, of a soft segment selected from the group including:
      hydroxyl terminated water-soluble polymers and amine terminated water-soluble polymers; and
   from about 1.5 percent to about 30 percent, by weight, of a hard segment including:
      at least one aromatic multifunctional isocyanate; and a chain extender having at least two functional groups capable of reacting with the isocyanate, at least one of the functional groups being a hydroxyl group attached to an aromatic ring.

6. The polymer of claim 5 wherein said chain extender is selected from the group including aromatic diols and aromatic triols having at least one aromatic hydroxyl group, and blends of at least one of said aromatic diols or triols with at least one aliphatic diols or aliphatic triols.

7. The polymer of claim 5 wherein said hydroxyl terminated water-soluble polymer is selected from the group including polyethylene oxide, copolymers of polymethylene oxide and polyethylene oxide, copolymers of polyethylene oxide and polypropylene oxide, and copolymers of polymethylene oxide and polypropylene oxide.

8. The polymer of claim 5 wherein said amine terminated water-soluble polymer is selected from the group including amine-terminated polyethylene oxide, amine-terminated copolymers of polymethylene oxide and polyethylene oxide, amine-terminated copolymers of polyethylene oxide and polypropylene oxide, and amine-terminated copolymers of polymethylene oxide and polypropylene oxide.

9. The polymer of claim 5 wherein said chain extender is substituted with at least one electron withdrawing substituent.

10. The polymer of claim 9 wherein said electron withdrawing substituent is selected from the group including nitrates, sulfonates, cyanates, esters, and amides.

11. The polymer of claim 5 wherein said chain extender is substituted with at least one electron donating substituent.

12. The polymer of claim 11 wherein said electron donating substituent is selected from the group including alkoxy groups, halides, alkyl and tertiary amines.

13. A superabsorbent polymer having the formula:

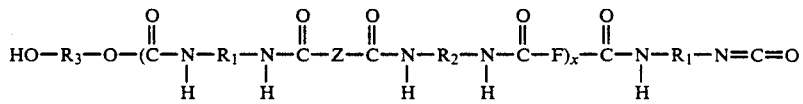

wherein $R_1$ is selected from aliphatic and aryl groups; and
wherein $R_2$ is selected from aliphatic and aryl groups so that said polymer has at least one $R_2$ which is an aryl group having from 6 to about 18 carbon atoms;
x is an integer of from 2 to 20;
Z is selected from the group including:

$$-B-(P)_n-B-$$

where B is selected from oxygen, nitrogen, and sulfur;
P is a water-soluble polymer;
n is an integer of from 3 to 500; and
F is selected from:

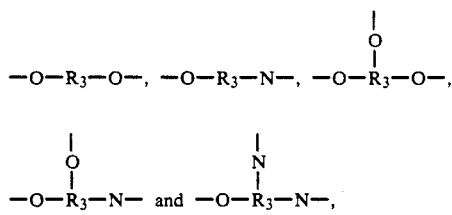

where $R_3$ is selected from substituted and unsubstituted aromatic groups and combinations of substituted and un-substituted aromatic and aliphatic groups so that said polymer is adapted, upon being heated to an elevated temperature, to dissociate into superabsorbent polymer fragments and, upon being cooled from said elevated temperature to ambient temperature, to re-associate.

14. The polymer of claim 13 wherein the water-soluble polymer "P" is selected from the group including polyethylene oxide, copolymers of polymethylene oxide and polyethylene oxide, copolymers of polyethylene oxide and polypropylene oxide, and copolymers of polymethylene oxide and polypropylene oxide.

15. The polymer of claim 13 wherein $R_3$ is selected from the group including aromatic groups substituted with at least one electron withdrawing substituent.

16. The polymer of claim 15 wherein $R_3$ is selected from the group including sulfonyldiphenyl, amino phenyl, benzoic acid, and phenyl acetic acid.

17. The polymer of claim 13 wherein $R_3$ is selected from the group including aromatic groups substituted with at least one electron donating substituent.

18. The polymer of claim 17 wherein $R_3$ selected from the group including thiodiphenyl, methyl phenyl and methoxy phenol.

19. Superabsorbent fibers formed from a superabsorbent polymer having a thermally reversible bond which is adapted to evanesce at an elevated temperature and revert to a thermally reversible bond upon cooling to ambient temperature so that said polymer is adapted, upon being heated to said elevated temperature, to dissociate into melt processable polymer fragments and, upon being cooled from said elevated temperature to ambient temperature, to re-associate.

20. The fibers of claim 19 wherein said thermally reversible bond is an aromatic urethane bond.

21. The fibers of claim 19 wherein said fibers are meltblown fibers.

22. The fibers of claim 19 wherein said meltblown fibers include microfibers.

23. The fibers of claim 19 comprising from about 1 percent, by weight, to about 80 percent, by weight, of one or more other materials selected from the group including wood pulp, natural fibers, synthetic fibers, particulates and superabsorbent particles.

24. A method of a forming superabsorbent fibers from a thermally reversible superabsorbent polymer comprising:
heating a thermally reversible superabsorbent polymer to a temperature sufficient to dissociate the polymer into polymer fragments;
passing said polymer fragments through means for forming fibers; and
cooling said fibers to re-associate said polymer fragments.

25. The method of claim 24 wherein said temperature is less than the degradation temperature of the polymer fragments.

26. The method of claim 24 wherein said means for forming fibers is selected from meltblowing processes and spunbonding processes.

27. A superabsorbent sheet formed from a superabsorbent polymer
having a thermally reversible bond which is adapted to evanesce at an elevated temperature and revert to a thermally reversible bond upon cooling to ambient temperature so that said polymer is adapted, upon being heated to said elevated temperature, to dissociate into melt processable polymer fragments and, upon being cooled from said elevated temperature to ambient temperature, to re-associate.

28. The sheet of claim 27 wherein said thermally reversible bond is an aromatic urethane bond.

29. The sheet of claim 27 wherein said sheet includes meltblown fibers.

30. The sheet of claim 20 wherein said meltblown fibers include microfibers.

31. The sheet of claim 27 comprising from about 1 percent, by weight, to about 80 percent, by weight, of one or more other materials selected from the group including wood pulp, natural fibers, synthetic fibers, particulates and superabsorbent particles.

32. A method of a forming a superabsorbent sheet from a thermally reversible superabsorbent polymer comprising:
heating a thermally reversible superabsorbent polymer to a temperature sufficient to dissociate the polymer into polymer fragments;
passing said polymer fragments through means for forming a sheet; and
cooling said sheet to re-associate said polymer fragments.

33. The method of claim 32 wherein said temperature is less than the degradation temperature of the polymer fragments.

34. The method of claim 32 wherein said means for forming a sheet is selected from meltblowing processes, spunbonding processes and film extrusion processes.

* * * * *